(12) United States Patent
Jin

(10) Patent No.: US 7,233,626 B2
(45) Date of Patent: Jun. 19, 2007

(54) FLEXIBLE BIT SELECTION USING TURBO TRELLIS-CODED MODULATION

(76) Inventor: Gary Q. Jin, 51 Liston Crescent, Kanata, Ontario, K2L 2W3 (CA)

(*) Notice: Subject to any disclaimer, the term of this patent is extended or adjusted under 35 U.S.C. 154(b) by 726 days.

(21) Appl. No.: 10/098,474

(22) Filed: Mar. 18, 2002

(65) Prior Publication Data

US 2002/0136320 A1  Sep. 26, 2002

(30) Foreign Application Priority Data

Mar. 23, 2001  (GB) ................................ 0107295.8

(51) Int. Cl.
*H04L 5/12* (2006.01)
(52) U.S. Cl. ...................... 375/265; 714/792
(58) Field of Classification Search ................ 375/265, 375/262; 714/792, 796, 786, 795
See application file for complete search history.

(56) References Cited

U.S. PATENT DOCUMENTS

| | | | | |
|---|---|---|---|---|
| 5,621,761 A | * | 4/1997 | Heegard ........................ | 375/265 |
| 5,790,570 A | * | 8/1998 | Heegard et al. ............... | 714/755 |
| 6,034,996 A | * | 3/2000 | Herzberg ....................... | 375/265 |
| 6,097,764 A | * | 8/2000 | McCallister et al. .......... | 375/298 |
| 6,549,584 B1 | * | 4/2003 | Gatherer et al. .............. | 375/261 |
| 6,671,327 B1 | * | 12/2003 | Jin .................................. | 375/265 |
| 6,757,859 B1 | * | 6/2004 | Jin .................................. | 714/755 |

FOREIGN PATENT DOCUMENTS

EP   1292037   12/2003

OTHER PUBLICATIONS

1) "Controlling clipping probability in DMT transmission", Alan Gatherer et al., 1998 IEEE, pp. 578-584.
2) "PAR reduction in multicarrier transmission systems", Jose Tellado et al., Dec. 8, 1997, pp. 1-14.
Liang Zhang et al., "Turbo Coding for Transmission over ADSL", Communication Technology Proceedings, 2000, WCC-ICCT 2000, International Conference, pp. 124-131.

* cited by examiner

*Primary Examiner*—Chieh M. Fan
*Assistant Examiner*—Jaison Joseph

(57) ABSTRACT

An encoder structure for use in a DMT communications system, has a turbo encoder for encoding a portion of a data stream and generating a coded output. A data combiner has a first input receiving a remaining uncoded portion of the data stream and at least one further input receiving the coded output of the turbo encoder. A selector determines the portion of the data stream applied to the turbo encoder based on the data rate, latency requirement, coding gain performance and circuit complexity.

11 Claims, 2 Drawing Sheets

FLEXIBLE BIT SELECTION USING TURBO TRELLIS-CODED MODULATION

BACKGROUND OF THE INVENTION

1. Field of the Invention

This invention relates to the field of digital communications, and in particular to a method of implementing turbo trellis code modulation in a flexible manner that can be adapted to transmission conditions.

2. Description of Related Art

In a digital communications channel it is common practise to include some form of coding scheme to increase the data throughput. Recently, turbo codes have gained in popularity due to their large coding gains. See Berrou and A. Glavieux, "Near Optimum Error Correcting Coding and Decoding: Turbo-Codes", IEEE Trans. on Communications, Vol. 44, No. 10, October, 1996. A turbo coder is a combination of two simple encoders. The input is a block of K information bits. The two encoders generate symbols from two simple recursive convolutional codes, each with a small number of states. The information bits are also sent uncoded. A key feature of turbo codes is the interleaver, which permutes the original K information bits before input to the second encoder. The permutation ensures that input sequences for which one encoder produces low-weight codewords generally causes the other encoder to produce high-weight codewords. Thus, even though the constituent codes are individually weak, the combination is powerful.

Turbo codes have been applied in DMT (Discrete Multi-tone) systems, for example, used in xDSL transmission. In xDSL systems, turbo code can be used to replace other types of trellis code to get better Bit-Error Rate(BER) performance. See, Hamid R. Sadjadpour, "Application of Turbo Codes for Discrete Multi-Tone Modulation Schemes", AT&T Shannon Labs., 1999. However, when the constellation size increases, the coding gain advantage of turbo code starts to diminish. This is because the redundant bits make the constellation size even larger. Turbo-trellis coded modulation, in which only the least significant bit (LSB) in constellation is coded has been introduced to achieve better performance than other trellis-coded modulation.

DMT is a type of Multicarrier Modulation. The basic idea behind multicarrier modulation is that multiple channels can be established with digital signal processing techniques using the Fast Fourier Transform (FFT). A DMT modem encodes bits into symbols and sends them through an inverse FFT and then converters the digital signal into analog, to send it through the copper phone wires. The receiving modem reverses the process. Many subchannels are used to transmit data, each having a different carrier and a different QAM (Quadrature amplitude modulation) constellation containing different number of bits per constellation. The multiple of carriers are implemented through the Discrete Fourier Transform. The number of data being transmitted per DMT symbol varies from 16 bits per symbol for ADSL upstream data transmission to a maximum 15000 bits per symbol for VDSL system. Since turbo code works well with a large interleaver size (typically larger than 1000 bits), at low data rates more bits, and possibly all the bits, need to be transmitted transmission to meet the latency requirement of the system. At high date rates, it is too costly to code all the data. Also, the performance will suffer for high constellation if all data are encoded.

There is a need for an effective encoder suitable for DMT applications.

SUMMARY OF THE INVENTION

In accordance with the invention an arbitrary number of bits can be coded based on coding gain performance, latency, data rate, and hardware capability.

Accordingly the present invention provides an encoder structure for use in a DMT communications system, comprising a turbo encoder for encoding a portion of a data stream and generating a coded output; a data combiner having a first input receiving a remaining uncoded portion of said data stream and at least one further input receiving said coded output, and an output for producing a combined data stream; and a selector for selecting the portion of said data stream applied to said turbo encoder.

The invention offers the ability to change the number of bits that are sent to the turbo encoder on a tone by tone basis. Some tones, depending on transmission conditions, will carry more bits per symbol than others, and the number of bits passed through the turbo encoder can be varied. In a typical example, there might be 750 tones with an average of six bits per tone. Of these two might be passed through the turbo encoder. But this number can be changed in accordance with the invention depending on the particular requirements.

The selector is typically implementing as a tone multiplexer. This generates the DMT tones, in the digital domain, allocates groups of bits to each tone, and then depending on the select input directs a subgroup of bits to the turbo encoder and the remainder straight to the data combiner where they are combined with the output of the turbo encoder into a common data stream for inputting to a QAM modulator.

Another aspect of the invention provides A decoder structure for a DMT modulated signal containing data which is at least partially turbo encoded, comprising a hard decoder for receiving a portion of an incoming data stream and generating an output bit stream; a soft decoder for receiving a remaining portion of an incoming data stream and generating a soft decoded output; a turbo decoder for decoder the output of said soft decoder; and a selector for selecting the number of bits in said soft decoder.

The invention also provides a method of transmitting data over a communications channel using DMT modulation, comprising receiving an input bit stream; allocating groups of bits to respective tones forming part of said DMT modulation scheme; for each tone determining from its allocated group a number of bits to be encoded; selecting said determined number of bits from each group and directing them to a turbo encoder; and combining an output of said turbo encoder with remaining bits of each group into a common bit stream for transmission over said communications channel.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
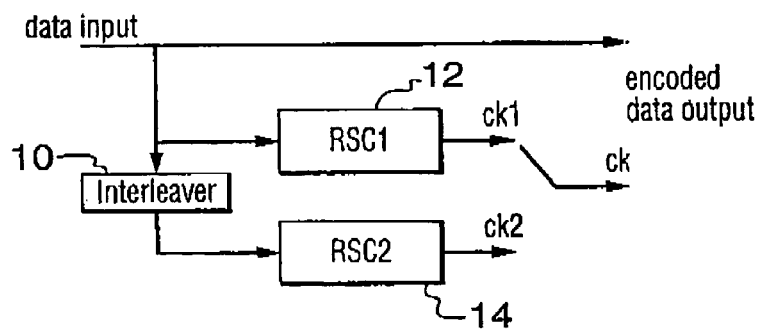
FIG. 1 is a block diagram of a turbo encoder.

As shown in FIG. 1, a turbo encoder comprises an interleaver 10, which receives a data stream at its input, and a pair of recursive systematic convolutional (RSC) coders 12, 14. One of the RSC encoders 12 takes the data stream in sequence as its input. The other RSC encoder 14 takes the interleaved data as its input.

As is known to persons skilled in the art, the output of the two RSC encoders 12, 14 is punctured to create error check bits. The final encoder outputs bit streams ck1 and ck2 include the error check bits inserted into the data stream based on the required encoder rate. These output streams ck1 and ck2 are then combined and sent as an output stream ck.

The coded and uncoded data is combined and sent to a QAM (Quadrature Amplitude Modulation) encoder for transmission over a communications channel.

Figure 2:
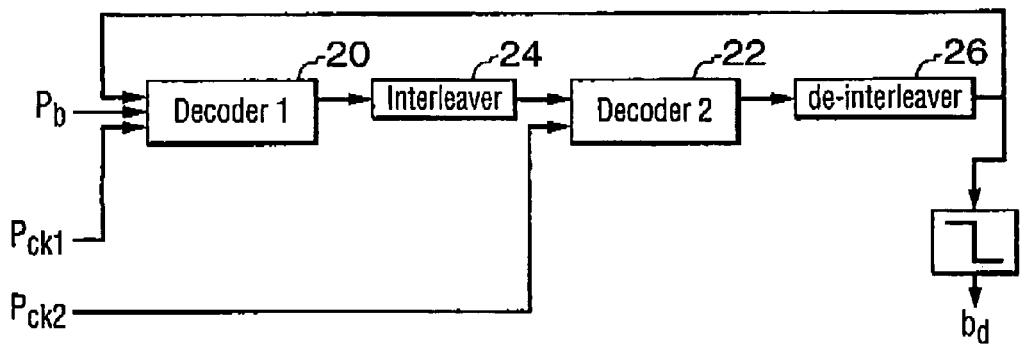
FIG. 2 is a block diagram of a turbo decoder.

A decoder is shown in FIG. 2. Received input streams $P_{ck1}$ and $P_{ck2}$ are fed to respective decoders 20, 22. The output of decoder 20 is fed to an input of decoder 22 through interleaver 24, and the output of decoder 22 is passed through de-interleaver 26 to produce decoded output stream $b_d$.

The encoder and decoder shown in FIGS. 1 and 2 are conventional and their operation is well understood by persons skilled in the art.

Figure 3:
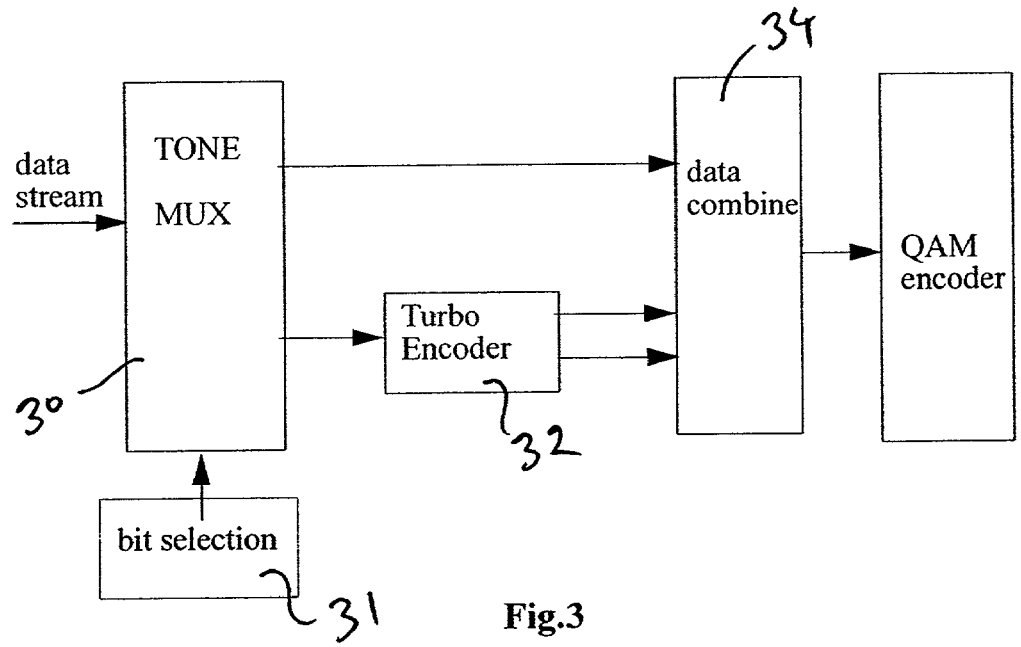
FIG. 3 is a block diagram of an encoder structure for turbo trellis code modulation in accordance with one embodiment of the invention.
Figure 4:
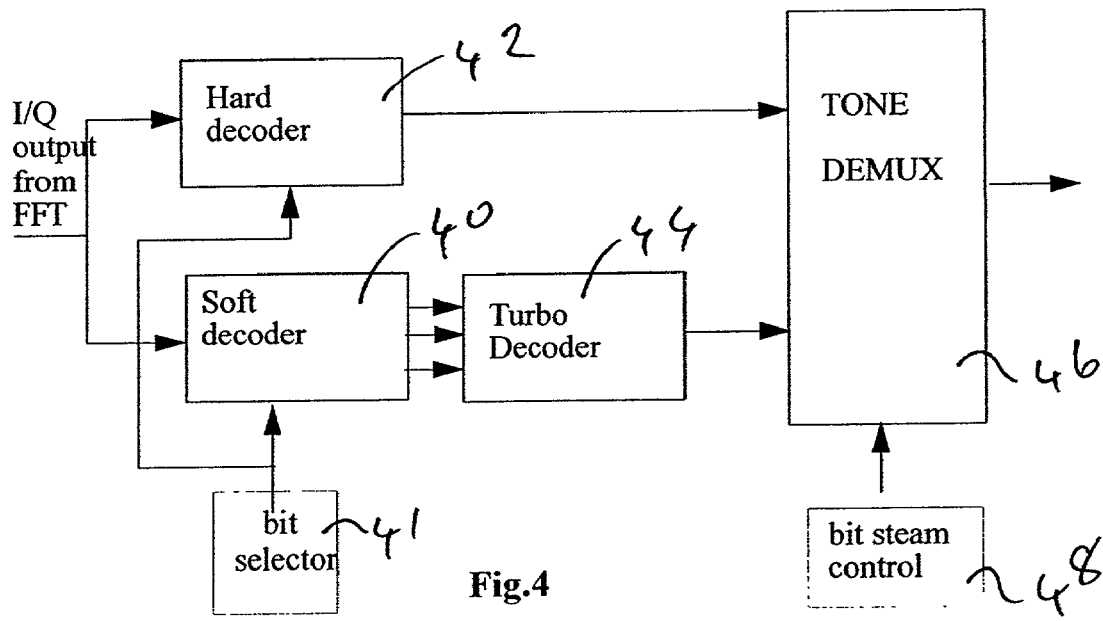
FIG. 4 is a block diagram of a decoder structure in accordance with one embodiment of the invention.

In the structure in accordance with one embodiment of the invention as shown in FIG. 3, an input data stream is passed through tone mux 30, controlled by a bit selector 31 which determines how many bits should be encoded. The uncoded bits are passed directly to data combiner 34, whereas the bits to be encoded are passed to the input of turbo encoder 32, producing two outputs from the respective RSCs, which are in turn connected to respective inputs of the data combiner 34. The data combiner 34 combines the inputs into a combined stream that is applied to the input of a Quadrature amplitude modulator 36. QAM 36 outputs a modulated signal over the transmission channel.

The tone mux 30, which operates in the digital domain, creates a series of tones, typically about 750, and allocates bits on an incoming block of data to the individual tones. Typically, there might be six bits allocated per tone. The tone mux 30, as its name implies, then directs the bits from each tone either to the turbo encoder 32 or to the data combiner depending on a decision as to how many bits for that tone will be encoded. For example, the bit selector 31 might determine that the two lowest order bits allocated to the tone go to the encoder 32 and the remaining bits go straight to the data combiner 34 for combining with the encoded bits to be subsequently forwarded as a combined bit stream to the QAM 36. The turbo encoder works in blocks of data and typically accumulates 1000 bits of data for each turbo encoding operation.

The bit selection is typically performed in a digital signal processor, which determines the number of bits to be encoded for each tone based on the particular requirements, namely latency requirement, coding gain performance and the circuitry complexity. In accordance with the invention any suitable method can be used for controlling the tone mux 30 to direct the desired number of bits respectively to the data combiner 34 and the turbo encoder 32.

By carefully selecting the combination address, it is possible to put the encoded data at any required QAM constellation location. Also, at the data combiner 34, any combination logic for the coded data can be applied to further improve the performance.

At decoder side, the bit selector 41 will determine which bits of the I and Q components of the received QAM constellation should go to soft decoder 40 and which should go to the hard decoder 42. The hard decoder 42 determines whether the uncoded data is a 0 or 1 whereas the soft decoder 40 outputs the probability of each encoded data bit being either a 0 or 1.

The turbo decoder 44 takes the soft decision from the soft decoder and starts the iteration MAP (Maximum a posteriori) decoder algorithm in a manner known per se.

The turbo decoder 44 actually includes two decoders as shown in FIG. 2, each corresponding to one of the RSC encoders in the turbo encoder. The decoder 20 takes the soft data stream and the corresponding error check bit for encoder 12 and performs a MAP decoder operation. The decoder 22 applies a MAP decoder algorithm on the interleaved soft data stream and the corresponding error check bit for encoder 14. After certain number of iterations, the hard decision on the encoded data is made to give an uncoded output bit.

Tone demux 46 with bit stream control then combines the coded and uncoded data and sends them out as a decoded data stream. The tone demux 46 is the converse of the tone mux 30. For each tone, it takes the hard decoded bits and the output of the turbo decoder 22 and produces an output data stream corresponding to the input to the tone mux 30. Bit stream control unit 48 ensures that the correct number of bits from the turbo decoder 44 is combined with the hard decoded bits for each tone. This can be implemented as a digital signal processor, for example.

The invention combines a Turbo coder and trellis-coded modulation, wherein the encoder can select any combination of data to be coded or uncoded. The structure is flexible so that any arbitrary number of bits in a QAM signal can be chosen to be coded.

The flexible decoder structure permits any bits in the I and Q components to be selected either to be hard decoded or to go through the MAP decoder procedure. The number of bits being coded is determined by data rate, latency requirement, coding gain performance and the circuitry complexity.

Any combination logic can be applied to the coded data.

Although the present invention has been described and illustrated in detail, it is clearly understood that the same is by way of illustration and example and is not to be taken by way of limitation, the spirit and scope of the present invention being limited only by the terms of the appended claims.

The invention claimed is:

1. An encoder structure for use in a Discrete Multitone (DMT) communications system, to encode a digital input data stream, comprising:

selection means for separating said input data stream into a plurality of groups of bits, each group corresponding to a respective one of a plurality of DMT tones, and selecting from each group a subgroup of bits for encoding, the number of bits in each subgroup being variable, directing each subgroup of bits to a turbo encoder and remaining bits directly to a first input of a data combiner, the turbo encoder being operable to encode each subgroup of bits and supply the resulting encoded subgroup of bits to a second input of the data combiner, the data combiner combining the encoded subgroups of bits with the respective uncoded remaining bits to form an output bit stream.

2. An encoder structure as claimed in claim 1, wherein said selection means comprises a tone multiplexer for receiving said input data stream and directing each said subgroup of bits to said turbo encoder.

3. An encoder structure as claimed in claim 2, wherein said data combiner comprises a pair of said inputs for receiving respective coded outputs of said turbo encoder.

4. An encoder structure as claimed in claim 1, further comprising a quadrature amplitude modulator connected to the output of said data combiner for receiving said combined data stream.

5. A decoder structure for a Discrete Multitone (DMT) modulated signal containing data which comprises different groups of bits allocated to different DMT tones, each group comprising a subgroup of turbo-coded bits with remaining bits being, the uncoded number of bits in each subgroup being variable, the decoder structure comprising: a hard decoder for receiving a portion of an incoming data stream and generating an output bit stream; a soft decoder for receiving a remaining portion of an incoming data stream and generating a soft decoded output; a turbo decoder for decoding the output of said soft decoder; and a demultiplexer means for combining the outputs of said turbo decoder and said hard decoder into a combined data stream, and means for controlling the demultiplexer means to ensure that, for each DMT tone, the correct number of bits from the turbo-decoder is combined with the bits from the hard decoder.

6. A decoder structure for a Discrete Multitone (DMT) modulated signal containing data which is at least partially turbo encoded, comprising: a hard decoder for receiving a portion of an incoming data stream and generating an output bit stream; a soft decoder for receiving a remaining portion of an incoming data stream and generating a soft decoded output; a turbo decoder for decoding die output of said soft decoder; and a demultiplexer for combining the outputs of said turbo decoder and said hard decoder into a combined data stream, wherein said demultiplexer is a tone demultiplexer that combines the output of said turbo decoder and said hard decoder for each tone.

7. A decoder structure as claimed in claim 6, further comprising a bit stream control unit for controlling said demultiplexer to combine the appropriate number of bits from said turbo decoder with the appropriate number of bits in said output bit stream of said hard decoder.

8. A method of transmitting data over a communications channel using Discrete Multitone (DMT) modulation, comprising: receiving an input bit stream; allocating groups of bits to respective tones forming part of said DMT modulation scheme; for each tone separating its allocated group into a subgroup of bits to be encoded and remaining bits that are not to be encoded, the actual number of bits in said subgroup being variable; directing said subgroups of bits to a turbo encoder; and combining an output of said turbo encoder with said remaining bits of each group into a common bit stream for transmission over said communications channel.

9. A method according to claim 8, wherein said common bit stream is passed to a QAM modulator.

10. A method of transmitting data over a communications channel using Discrete Multitone (DMT) modulation, comprising: receiving an input bit stream; allocating groups of bits to respective tones forming part of said DMT modulation scheme; for each tone determining from its allocated group a number of bits to be encoded; selecting said determined number of bits from each group and directing them to a turbo encoder; and combining an output of said turbo encoder with remaining bits of each group into a common bit stream for transmission over said communications channel, wherein said common bit stream is passed to a QAM modulator, and wherein received bits from a QAM constellation after transmission over said communications channel are passed to either to a soft decoder or a hard decoder, an output of said hard decoder is passed directly to a demultiplexer, an output of said soft decoder is passed to a turbo decoder, and an output of said turbo decoder is passed to said demultiplexer for mixing into a common output stream with said output of said hard decoder, said demultiplexer having a bit stream control input for determining the number of bits from said turbo decoder to be mixed with the output of said hard decoder in each group.

11. A method as claimed in claim 10, wherein said demultiplexer is a tone demultiplexer that combines said bits on a tone by tone basis.

* * * * *